United States Patent Office 3,507,886
Patented Apr. 21, 1970

3,507,886
PURIFICATION OF CRUDE PHTHALIC ANHYDRIDE BY THERMAL TREATMENT
Hubert Suter, Guenter Poehler, Karl-Heinz Mueller, and Friedrich Wirth, Ludwigshafen (Rhine), Germany, assignors to Badische Anilin- & Soda-Fabrik Aktiengesellschaft, Ludwigshafen (Rhine), Germany
No Drawing. Filed May 5, 1967, Ser. No. 636,280
Claims priority, application Germany, May 25, 1966, 1,259,870
Int. Cl. C07c 63/18
U.S. Cl. 260—346.7
9 Claims

ABSTRACT OF THE DISCLOSURE

A continuous process for purifying crude phthalic anhydride by thermal treatment in a series of stirred vessels consisting of 2–5 stages at temperatures of 190–275° C., each stage having a temperature equal to, or up to 40° higher than, that of the preceding stage.

---

The invention relates to an improved process for the purification of crude phthalic anhydride.

As is well known, crude phthalic anhydride is contaminated with small amounts of phthalic acid, maleic acid, fumaric acid, maleic anhydride and possibly naphthoquinone and other compounds. Depending on the starting material used (commercial-scale production is by oxidation of o-xylene or naphthalene of varying origin) the various impurities occur in varying amounts. For purification the crude product is usually subjected to thermal treatment at from 190° to 275° C. This treatment is often carried out in the presence of acids or alkalies as condensing agents.

In this treatment naphthoquinone is condensed to form non-volatile products, the acids are converted into their anhydrides with the elimination of water, fumaric acid is substantially converted into maleic acid or maleic anhydride, and volatile compounds, such as water, sulfur dioxide, carbondioxide, maleic anhydride, benzoic acid and unreacted hydrocarbons, are substantially expelled. A phthalic anhydride is obtained from which an extremely pure phthalic anhydride can be recovered in a simple way by distillation. The thermal treatment has hitherto only been carried out batchwise, a method which involves long heating and treating periods. The initially vigorous evolution of gas necessitates careful control of the reaction. In spite of this the quality of the product varies from batch to batch and the procedure of the subsequent distillation must therefore be adapted to each batch.

If an attempt is made to carry out the treatment continuously in a stirred vessel at a temperature between 190° and 275° C. with continuous feed and withdrawal, no satisfactory purity is achieved even in the case of extremely long mean residence times. When low temperatures are used the impurities are not removed, whereas in the case of high temperatures decomposition of the phthalic acid into carbon dioxide and benzoic acid occurs to an increasing extent.

It is an object of this invention to provide a process for purifying crude phthalic anhydride by thermal treatment which is carried out continuously, which does not require long heating and treating periods, which can be easily controlled and which gives products of uniform quality.

This and other objects are achieved by a process for purifying crude phthalic anhydride by thermal treatment wherein the improvement comprises treating the crude phthalic anhydride continuously at temperatures of from 190° to 275° C. in a series of stirred vessels which consists of at least two stages, a temperature above 230° C. being maintained in at least one stage and each stage having a temperature equal to, or up to 40° C. higher than, that of the preceding stage.

When using this method the impurities are substantially removed. There is practically no decomposition of phthalic acid into carbon dioxide and benzoic acid. The heating periods which are usual in batchwise operation are unnecessary and the residence times are relatively short. Continuous treatment in accordance with the invention can therefore be effected in a much smaller reaction space than has hitherto been possible.

In general the crude phthalic anhydride obtained in the oxidation of o-xylene or naphthalene is used as the crude product. This crude product usually contains 90 to 98% by weight of phthalic anhydride and small amounts of phthalic acid, maleic acid, fumaric acid, maleic anhydride, benzoic acid, possibly sulfur in the form of unknown compounds (if sulfur-containing starting materials are used) and possibly naphthoquinone (if naphthalene is used as starting material). For rapid condensation of the naphthoquinone it is essential that the sulfur content of the crude product is from about 0.05 to 0.5% by weight; the optimum sulfur content can be easily determined by experiment. In the case of naphthoquinone-containing crude products with too low a sulfur content it is advisable to add an appropriate amount of sulfuric acid to the crude phthalic anhydride.

The treatment is carried out in a cascade of at least 2, advantageously 2 to 5, particularly 3 or 4 stirred vessels. The crude product is fed continuously to the first vessel. The mixture leaving the first vessel after a certain mean residence time passes through at least one further vessel and, after leaving the last vessel, can be immediately subjected to further purification by distillation.

The treatment is carried out at a temperature of from 190° to 275° C., a temperature above 230° C. being maintained in at least one vessel and each vessel advantageously having a temperature equal to, or up to 40° C. higher than, that of the preceding vessel. In a three-stage treatment the temperatures are for example 190° to 240° C. in the first stage, 200° to 250° C. in the second stage, and 230° to 275° C. in the third stage. The residence times in the various stages may be equal or different. In general, the residence time in each stage is from 1 to 10 hours, particularly 2 to 6 hours. The total residence time is usually from 5 to 20 hours.

The treatment in accordance with the invention is effected at a pressure of from about 560 to 860 mm. Hg, usually at atmospheric pressure. It is advantageous to use slightly subatmospheric pressure, i.e. about 560 to 750 mm. Hg, in order to facilitate the separation of the more volatile constituents. The use of slightly superatmospheric pressure, i.e. about 770 to 860 mm. Hg, does not offer any special advantages.

The phthalic anhydride obtained is of uniform quality, practically free from more volatile constituents and free from naphthoquinone. In subsequent distillation a phthalic anhydride of the highest purity is obtained.

The invention is further illustrated by the following examples in which percentages are by weight.

EXAMPLE 1

200 g. per hour of molten crude phthalic anhydride obtained by oxidation of naphthalene and having the following composition:

|  | Percent |
|---|---|
| Phthalic anhydride | 92.1 |
| Phthalic acid | 5.6 |
| Naphthoquinone | 0.5 |
| Maleic anhydride and maleic acid | 0.2 |
| Sulfur | 0.3 |
| Residue | 1.3 | is fed continuously into an apparatus consisting of 3 stirred flasks connected in series, each having a capacity of 0.6 l. The temperature is 200° C. in the first flask, 220° C. in the second flask, and 240° C. in the third flask; the total residence time is 9 hours. Dehydration is complete after the second stage; the product then consists of 95.7% of phthalic anhydride, 0.08% of naphthoquinone and 4.1% of residue. In the third stage the naphthoquinone content is reduced to 0.005%. A product of uniform quality is available for subsequent distillation.

EXAMPLE 2

The procedure of Example 1 is followed except that an apparatus is used which consists of 2 stirred flasks connected in series, each having a capacity of 0.6 l., and that the temperature is 240° C. in both flasks. After a residence time of only 6 hours a product is obtained whose naphthoquinone content is as low as 0.008%.

EXAMPLE 3

The procedure of Example 1 is followed but using a crude phthalic anhydride obtained by oxidation of o-xylene and having the following composition:

|  | Percent |
|---|---|
| Phthalic anhydride | 94.3 |
| Phthalic acid | 4.5 |
| Maleic acid | 0.4 |
| Benzoic acid | 0.3 |
| o-Toluic acid | 0.1 |
| Phthalide | 0.1 |
| Residue | 0.2 |

The temperature is 210° C. in the first stage, 225° C. in the second stage, and 240° C. in the third stage. After a mean residence time of 9 hours a product is obtained which consists of 98.9% of phthalic anhydride, 0.3% of benzoic acid and 0.6% of residue.

We claim:
1. A process for the pre-distillation purification of crude phthalic anhydride by thermal treatment, wherein the improvement comprises treating the crude phthalic anhydride continuously at temperatures of from 190° to 275° C. in a series of stirring vessels consisting of 2 to 5 stages, each stage having a temperature equal to, or up to 40° C. higher than, that of the preceding stage.

2. A process as claimed in claim 1 wherein the residence time in each stage is from 1 to 10 hours.

3. A process as claimed in claim 1 wherein the total residence time is from 5 to 20 hours.

4. A process as claimed in claim 1 wherein a pressure of from 560 to 860 mm. Hg is used.

5. A process for the pre-distillation purification, by thermal treatment, of crude phthalic anhydride obtained by oxidation of o-xylene, wherein the improvement comprises treating the crude phthalic anhydride continuously at temperatures of from 190° to 275° C. in a series of stirring vessels consisting of 2 to 5 stages, each stage having a temperature equal to, or up to 40° C. higher than, that of the preceding stage.

6. A process for the purification, by thermal treatment, of crude phthalic anhydride obtained by oxidation of naphthalene and having a sulfur content of from 0.05 to 0.5% by weight, wherein the improvement comprises treating the crude phthalic anhydride continuously at temperatures of from 190° to 275° C. in a series of stirring vessels consisting of 2 to 5 stages, each stage having a temperature equal to, or up to 40° C. higher than, that of the preceding stage, a temperature above 230° C. being maintained in at least one vessel, and thereafter distilling the resultant composition.

7. A process as claimed in claim 5 wherein a temperature above 230° C. is maintained in at least one vessel.

8. A process as claimed in claim 6 wherein said process is a three stage process, the temperature of the first stage being 190–240° C., the temperature of the second stage being 200–250° C. and the temperature of the third stage being 230–275° C.

9. A process as claimed in claim 8 wherein the total residence time in said stages is 5–20 hours and the residence time in each stage is 1–10 hours.

References Cited

UNITED STATES PATENTS 2,105,911  1/1938  Foster _____ 260—346.7

FOREIGN PATENTS 136,374  1/1930  Switzerland.

ALEX MAZEL, Primary Examiner
B. I. DENTZ, Assistant Examiner